(12) United States Patent
Muthupandi et al.

(10) Patent No.: US 10,672,048 B2
(45) Date of Patent: Jun. 2, 2020

(54) SYSTEM AND METHOD FOR DETERMINING THE LEGITIMACY OF ONLINE PHARMACIES

(71) Applicant: The Penn State Research Foundation, University Park, PA (US)

(72) Inventors: Sowmyasri Muthupandi, Chennai (IN); Hui Zhao, Pine Grove Mills, PA (US); Soundar R. Tirupatikumara, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 239 days.

(21) Appl. No.: 16/002,171

(22) Filed: Jun. 7, 2018

(65) Prior Publication Data

US 2018/0357690 A1 Dec. 13, 2018

Related U.S. Application Data

(60) Provisional application No. 62/516,231, filed on Jun. 7, 2017.

(51) Int. Cl.
*G06Q 30/06* (2012.01)
*G06N 7/00* (2006.01)
(Continued)

(52) U.S. Cl.
CPC ..... *G06Q 30/0609* (2013.01); *G06F 16/9535* (2019.01); *G06N 7/005* (2013.01);
(Continued)

(58) Field of Classification Search
None
See application file for complete search history.

(56) References Cited

U.S. PATENT DOCUMENTS 7,457,823 B2 * 11/2008 Shraim ............... H04L 51/12
8,473,491 B1 * 6/2013 Yuksel ............... G06Q 10/06
707/732

(Continued)

FOREIGN PATENT DOCUMENTS

CN 103226578 7/2013

OTHER PUBLICATIONS

Singletary, M., "Web Pharmacies Can Endanger Your Health and Wallet," Washington Post, final edition, Aug. 12, 2004, p. E03. (Year: 2004).*
ASOP Global—LegitScript Online Pharmacy Market, Jul. 2016 (http://buysaferx.pharmacy/wp-content/uploads/2016/11/Online_Pharmacy_Market.pdf) 12 pages.
(Continued)

*Primary Examiner* — Nicholas D Rosen
(74) *Attorney, Agent, or Firm* — Riverside Law LLP

(57) ABSTRACT

A method of assessing the legitimacy of a subject pharmacy website includes the steps of, from a network-enabled computing device, generating a prediction model comprising a list of pharmacy websites of known legitimacy and a first set of websites which contain at least one referring link to at least one of the list of pharmacy websites of known legitimacy, from the network-enabled computing device, collecting a second set of websites which contain at least one referring link to a subject pharmacy website whose legitimacy is unknown, isolating a subset of websites from the second set of websites based on the prediction model, comparing the subset of websites to the first set of websites linked to the list of pharmacy websites whose legitimacy is known, and determining the legitimacy of the subject pharmacy website based on the comparison to the first set of known legitimate pharmacy websites.

20 Claims, 4 Drawing Sheets

(51) Int. Cl.
*G06Q 30/00* (2012.01)
*G06F 16/9535* (2019.01)
*G06N 20/00* (2019.01)

(52) U.S. Cl.
CPC ......... *G06N 20/00* (2019.01); *G06Q 30/0185* (2013.01); *G06Q 30/018* (2013.01)

(56) References Cited

U.S. PATENT DOCUMENTS

| | | | |
|---|---|---|---|
| 9,135,625 B1* | 9/2015 | Yuksel | G06Q 10/06 |
| 10,075,417 B2* | 9/2018 | Baughman | H04L 67/2814 |
| 2006/0069697 A1* | 3/2006 | Shraim | H04L 51/12 |
| 2016/0004979 A1 | 1/2016 | Getchius | |
| 2018/0077120 A1* | 3/2018 | Baughman | H04L 63/0281 |

OTHER PUBLICATIONS

Contini et al., "PharmaGuard WebApp: an application for the detection of illegal online pharmacies", Proceedings of KDWEB, 2016, 4 pages.

Corona et al., "PharmaGuard: Automatic Identification of Illegal Search-Indexed Online Pharmacies", IEEE International Conference on Cybernetics—Special session Cybersecurity (CYBERSEC), 2015.

Katsuki et al., "Establishing a Link Between Prescription Drug Abuse and illicit Online Pharmacies: Analysis of Twitter Data", Journal of Medical Internet Research, 17(12):e280, 2015. 12 pages.

Pharmacrime 2: A Practical Guide for Investigations on Illegal Internet Pharmacies, Jun. 2012 (http://www.globalforumljd.org/sites/default/files/docs/library/IRACM%20A%20Practical%20Guide%20for%20Investigations%20on%20Illegal%20Internet%20Pharmacies.pdf) 23 pages.

* cited by examiner

SYSTEM AND METHOD FOR DETERMINING THE LEGITIMACY OF ONLINE PHARMACIES

CROSS-REFERENCE TO RELATED APPLICATIONS

This application claims priority to U.S. Provisional Patent Application No. 62/516,231 filed on Jun. 7, 2017, incorporated herein by reference in its entirety.

BACKGROUND OF THE INVENTION

As the Internet matures and extends its reach, more and more products previously available only in physical stores are being offered for sale online. In recent years, the number of online pharmacies has grown tremendously, but with increased convenience and competition come new and unforeseen risks. Licit online pharmacies provide a safe and potentially cost-saving alternative to local stores, allowing patients to shop around for deals in a market known for sometimes extortionate pricing. The increasing acceptance of purchasing prescription drugs online has also opened the doors for illicit players to enter the market, offering unfettered access to prescription drugs and even controlled substances. Such sites not only threaten the rest of the emerging industry, but also pose dramatic risks to drug supply chain integrity and public health.

Current attempts to safeguard customers take the form of white- and black-lists, painstakingly assembled and maintained by third parties such as the National Association Board of Pharmacies (NABP) or LegitScript. These present two problems. First, a white list verification system requires consumer awareness of the problem, and for consumers to take the extra step of checking a potential pharmacy against known lists. Second, the dynamic nature of online commerce makes it trivial to shut a site down once it has been blacklisted and start it up again under a new domain. Though a white list might be feasibly maintained given a high level of effort, the creation and upkeep of a comprehensive blacklist of online pharmacies is impractical.

One example of an existing system for digital classification of licit online pharmacies (LOPs) and illicit online pharmacies (IOPs) is the work by Corona, et al (2015). Corona aims to build a database of online pharmacies using textual content analysis, i.e., analyzing the HTML or other content appearing on the pharmacy website itself to determine whether the online pharmacy is illicit or licit. This approach has a major disadvantage in that it can be manipulated by IOPs to affect prediction results. For example, if the prediction is based on certain content appearing on the websites, then IOPs could delete/change the content to confuse the model by making their IOPs look similar to LOPs.

Thus, there is a need in the art for an automated, algorithmic method of determining the legitimacy of an online pharmacy that is based on publicly-available data and that cannot easily be manipulated by IOP operators, in order to more effectively regulate the online sale of pharmaceuticals. The present invention satisfies that need.

SUMMARY OF THE INVENTION

In one aspect, a method of assessing the legitimacy of a subject pharmacy website includes the steps of generating a prediction model comprising a list of pharmacy websites of known legitimacy and a first set of websites which contain at least one referring link to at least one of the list of pharmacy websites of known legitimacy, collecting a second set of websites which contain at least one referring link to a subject pharmacy website whose legitimacy is unknown, isolating a subset of websites from the second set of websites based on the prediction model, comparing the subset of websites to the first set of websites linked to the list of pharmacy websites whose legitimacy is known, and determining the legitimacy of the subject pharmacy website based on the comparison to the first set of known legitimate pharmacy websites.

In one embodiment, the prediction model is a k-nearest neighbor prediction model. In one embodiment, k is equal to 2. In one embodiment, the prediction model executes in real-time to filter search engine results. In one embodiment, the prediction model is configured to minimize the probability that an illicit pharmacy website will mistakenly be classified as legitimate. In one embodiment, if the probability that the unknown pharmacy website is legitimate is above a certain threshold, the method includes the step of adding the unknown pharmacy website to the prediction model as a known legitimate pharmacy website.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
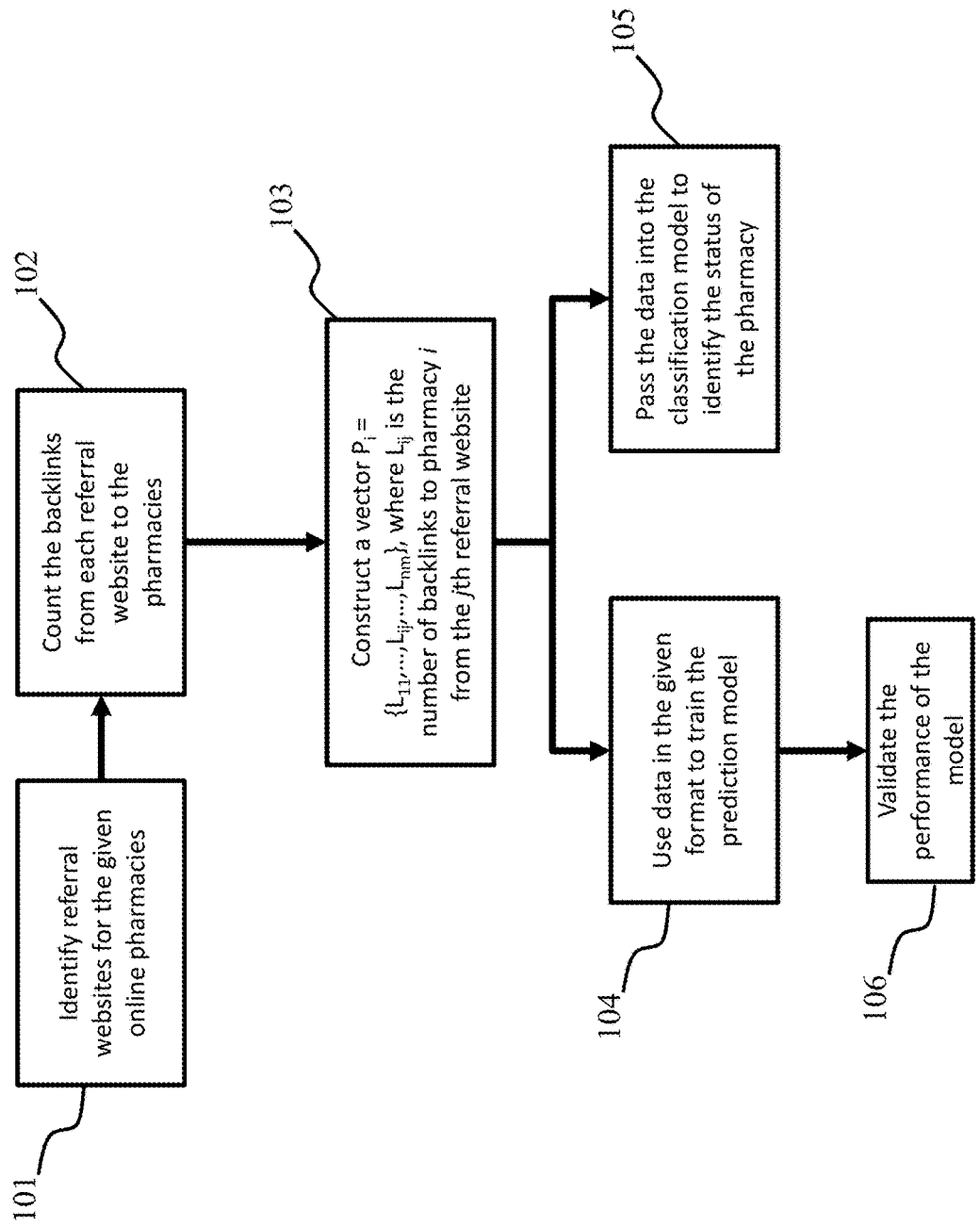
FIG. 1 is a diagram of one aspect of the present invention.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the present invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, or Zigbee® communication links, or any other method by which one electronic device is capable of communicating with another. In some embodiments, elements of the networked portion of the invention may be implemented over a Virtual Private Network (VPN).

For the purposes of this disclosure, the term "illicit online pharmacy" refers to an online pharmacy knowingly engaging in any behavior that is in violation of applicable laws or regulations, including but not limited to selling prescription drugs to customers without a valid prescription, selling expired, inappropriate, or counterfeit drugs, vending drugs that are deemed to be unapproved under applicable law, or facilitating the trade of drugs by pharmacies or other entities that do not have licenses to sell medication under applicable laws. By contrast, a "licit" or legitimate online pharmacy is one that sends appropriate drugs directly to customers, only if a valid prescription is provided.

The present invention refers to the following types of data collection, which are understood to be defined as follows: "web mining" adopts mining techniques to automatically discover and explore data from web services and documents (Etzioni, 1996), and comprises web content mining, web structure mining, and web usage mining. Web content mining involves exploring web content data which might be textual, image, audio, video, metadata and hyperlinks (Kosala & Blockeel, 2000). Web structure mining models the link structures of the web pages using the topology of the hyperlinks with or without their information (Chakrabarti et al, 1999). It is widely used for categorization or classification and clustering of webpages. Many web page ranking algorithms exploit web structure mining. Links from other websites to the site being evaluated are referred to as "backlinks." The available data often includes the domain of the referring website, their IP address, and countries of origin. Web usage mining studies the data generated by web surfers' sessions (Cooley et al, 1997) such as web server browser logs, user profiles, user transactions, mouse clicks and scrolls, and any other data as the results of interactions Web analytics is a function of web usage mining to optimize websites' goals. For example, if a user accesses a site and then a few seconds later closes the window, web usage mining would reveal that the user had one "page view" and a very short "session" within the site, potentially indicating a negative reaction to that site's content. Such a single-view session may also be called a "bounce", and be used to calculate a "bounce rate". The "bounce rate" is understood to mean the percentage of viewers who open a page and then navigate away or close the browser window without clicking any links. By contrast, if a user spends a 20 minute "session" clicking various links to navigate to various sub-pages of a site, usage mining would reveal that the user had many discrete page views and a longer session, potentially indicating a positive reaction to the site's content. In addition to the total usage data, it is also useful to consider the proportional usage of the site from different countries.

One aspect of the present invention relates to the collection of data in order to construct a prediction model or a classifier model. In one embodiment, the model begins as a list of website addresses of known illicit and licit online pharmacies, compiled by using existing verification methods. In some embodiments, a next step involves checking all the website addresses in the list to remove those addresses that are no longer valid or no longer host pharmacy websites. In some embodiments, the list is further consolidated to remove certain sites based on the integrity of the data source from which the information was collected.

Once the final list of website addresses has been compiled, the next step is to gather available data about each website, including but not limited to web mining, usage mining, structure mining, collecting website traffic information, collecting referral websites, and collecting related keywords. For the purposes of the present disclosure, "related keywords" are divided into two types: Search Engine Optimization (SEO) keywords, and Pay-Per-Click (PPC) keywords. SEO keywords are understood by those skilled in the art to mean words or phrases that are added to a webpage, either visible in the content or invisible in the page's HyperText Markup Language (HTML) structure, in order to affect the indexing done by search engines as they programmatically determine content. For instance, an innocuous-looking pharmacy webpage might incorporate invisible text or tags in its HTML structure containing keywords related to illicit drugs or controlled substances, in order to appear higher in the list of search results for people searching for illicit drugs or controlled substances. PPC keywords, by contrast, are keywords that the owner of a site provides to an advertiser such as Google AdWords. Websites wishing to be listed as sponsored search results submit keywords that they wish to "bid" on, as well as a maximum bid amount per click. When a user searches for one or more of the provided keywords, if the website's "bid" is high enough, the website might appear in one of the top "sponsored" spots in Google's search results, increasing the likelihood that the user will click the link and navigate to the website based on the keywords.

Where available, certain embodiments of the invention may also collect total traffic and engagement; the percentage of traffic from direct, search, referral, social media, display ads, and e-mail; the proportion of social media traffic originating from different particular social media sites; referral domain data; the number of backlinks; and proportional traffic contributions from organic and paid keywords.

For the purposes of the present disclosure, "direct" traffic is traffic from a user typing in the URL of the website being examined into their browser. A high proportion of direct traffic may indicate that the website is a powerful or memorable brand, because users do not need to search for the website in order to find it. "Search" traffic is traffic directed from search engine results, including both organic search results and paid search results. "Referral" traffic is traffic directed from links on other websites. "Social" traffic is a subset of referral traffic, particularly the referral traffic where the link was posted to a social media website. "Display" traffic is traffic directed from banner ads posted on other websites. Finally, "E-mail" traffic is traffic directed from links sent to a user via electronic mail.

In one embodiment, the classifier model of the present invention is a binary classifier, and is structured such that false positives are minimized. In the practice of classifying online pharmacies, it is understood that a false negative (i.e. the mistaken classification of a licit pharmacy as illicit) is less harmful to consumers and public health than a false positive (i.e. the mistaken classification of an illicit pharmacy as licit). It is therefore advantageous to create a classifier model that minimizes the likelihood of false positives, even if such a model allows for more false negatives.

Referring now to FIG. 1, a framework for predicting the status of online pharmacies is shown. First, a list of referral websites for a list of online pharmacies is generated 101. Then the backlinks from each referral website to each pharmacy website is counted 102. Next, the counts are compiled into a vector representation $P_i = \{L_{11}, \ldots, L_{ij}, \ldots, L_{nm}\}$, where $L_{ij}$ is the number of backlinks to pharmacy i from the jth referral website. In a first phase, the vector data belong to a pharmacy website whose legitimacy is known, and so the data is used to train the prediction model 104. Once the model is trained, the known data can be run through the prediction model again 106 in order to validate the model. Finally, data corresponding to a pharmacy website of unknown legitimacy is passed through the prediction model 105, and the output of the prediction model is used to identify the legitimacy of the pharmacy website.

Figure 2:
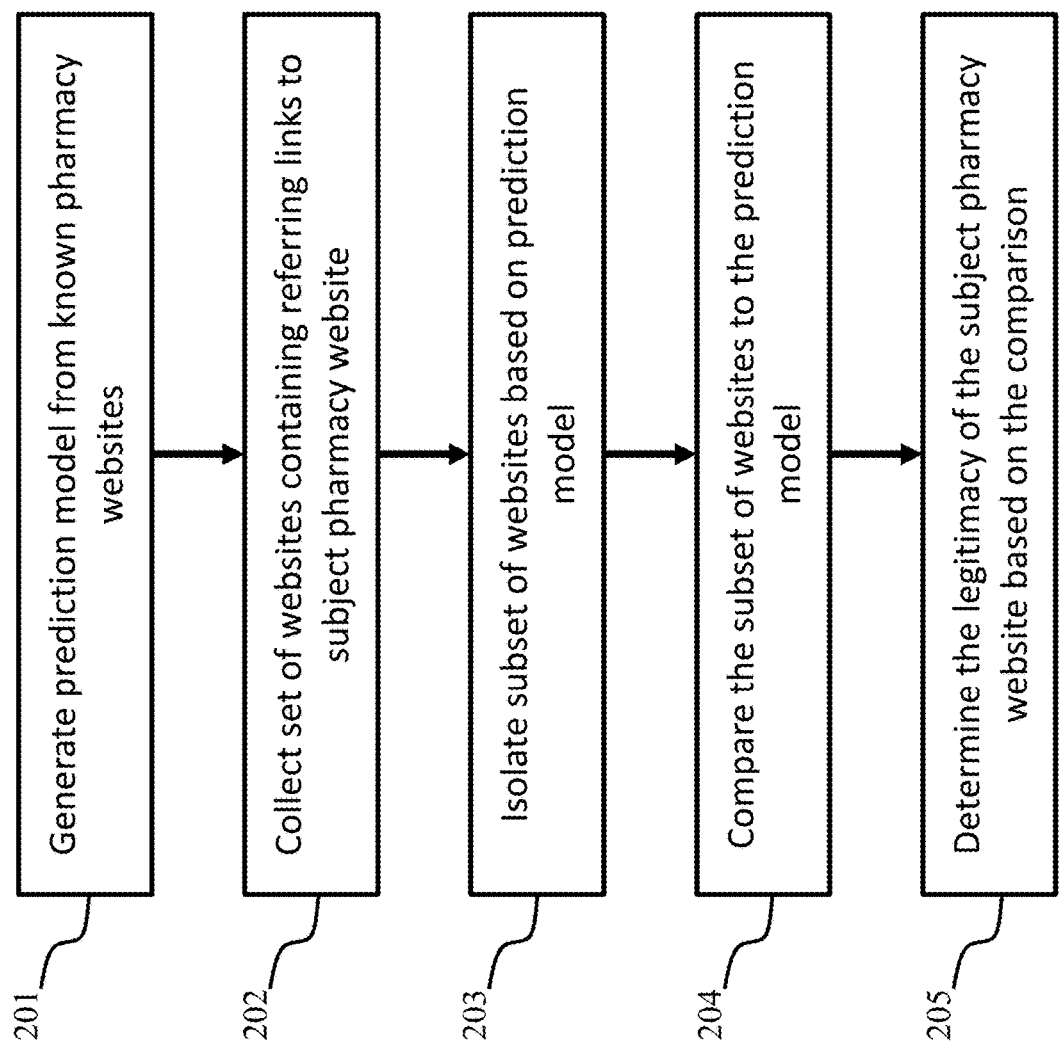
FIG. 2 depicts a method of one aspect of the present invention.

With reference now to FIG. 2, a method of assessing the legitimacy of a subject pharmacy website is shown. The method comprises the steps of generating a prediction model based on a list of pharmacy websites of known legitimacy 201, collecting a set of websites which contain at least one referring link to a subject pharmacy website whose legitimacy is unknown 202, isolating a subset of websites from the second set of websites based on the prediction model 203, comparing the subset of websites to the first set of websites linked to the list of pharmacy websites whose legitimacy is known from the prediction model 204, and determining the legitimacy of the subject pharmacy website based on the comparison to the first set of known legitimate pharmacy websites 205.

In one embodiment, the prediction model is a K-Nearest-Neighbor (KNN) model, where K is a positive integer. The KNN model operates by constructing a data space of d dimensions where d is the number of parameters being compared between each data point. Each known data point (here, each known licit and illicit pharmacy) is then assigned coordinates in the d-space based on its parameter values. An unknown data point is then assigned coordinates in the d-space, and the Euclidean distance between the unknown data point and all the known data points is calculated, to determine the k closest known points to the unknown data point. The status of the k closest known points is then determined, and the unknown point is determined to have the same status as the majority status of the k closest known points. In this example, if k was 3 and an unknown pharmacy was being assessed, where the three closest known data points were one licit pharmacy and two illicit pharmacies, the KNN algorithm would determine that the unknown pharmacy was most likely illicit, due to its proximity to more illicit pharmacies than licit pharmacies.

In one embodiment of the present invention, the notations used are:

I=The set of pharmacies. $i \in I$, $i=1, 2, \ldots, n$

J=The set of referring websites $j \in J$, $j=1, 2, \ldots, m$ $l_{(i,j)}$=Number of backlinks to pharmacy i from referring website j $y_i$=Status or class for pharmacy i. (1=illicit, 0=licit)

k=Parameter for classification algorithm in KNN

D=Similarity measure computed between two pharmacies

Q=The subset of k closest pharmacies to a given pharmacy based on D.

q=Index of pharmacies in subset Q, $q=1, 2, \ldots k$

In this embodiment, the data is represented as:

$$\begin{bmatrix} l_{(1,1)} & \cdots & l_{(1,m)} \\ \vdots & \ddots & \vdots \\ l_{(n,1)} & \cdots & l_{(n,m)} \end{bmatrix} \begin{bmatrix} y_1 \\ \vdots \\ y_n \end{bmatrix}$$

Where each row $1, 2 \ldots m$ represents the number of backlinks to a given pharmacy website and each column $1, 2, \ldots, n$ represents a pharmacy website. A pharmacy x whose status is to be predicted is represented by the status $y_x$ represented as:

$$y_x = [l_{(x,1)} \cdots l_{(x,m)}]$$

The first step is to compute the each Euclidean distance D between pharmacy x and each other online pharmacy i∈I $$D_i = \sqrt{\sum_{j=1}^{m}(l_{(i,j)} - l_{(x,j)})^2}$$

Next, the pharmacies i are ordered with respect to $D_i$, such that the k pharmacies with the highest $D_i$ belong to the set Q. The status or class that is most prevalent in Q is then assigned as the status or class $y_x$ of pharmacy x.

Figure 3:
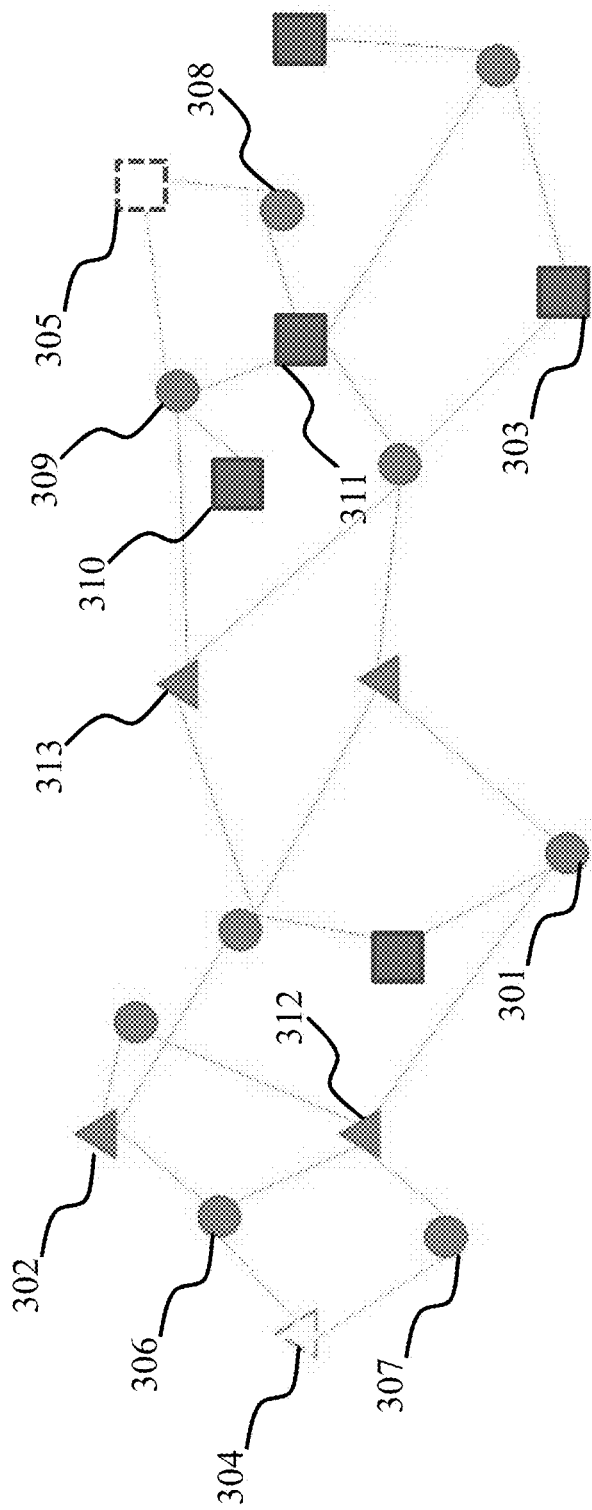
FIG. 3 is a structural diagram depicting a linked structure of websites.

In another embodiment, the prediction model is a Rating Method (RM) model. The RM determines the probability that a pharmacy website is legitimate based on the backlinks to the pharmacy website being evaluated. An exemplary graph is shown in FIG. 3, wherein the circles (for example 301) represent referral websites, the triangles (for example 302) represent known legitimate pharmacy websites, and the squares (for example 303) represent known illicit pharmacy websites. The lines represent hyperlinks from a referral website to a pharmacy website. The empty shapes with broken lines 304 and 305 are pharmacies whose status is unknown, but has been inferred based on their links. As shown in FIG. 3, unknown pharmacy 304 has been linked from referral sites 306 and 307, which have links only to the unknown pharmacy 304 and known legitimate pharmacies 302 and 312. Based on this information, the RM infers that pharmacy website 304 is most likely legitimate, because all other pharmacies linked from websites 306 and 307 are legitimate. By contrast, unknown pharmacy 305 is linked from websites 308 and 309, which also contain links to known illicit pharmacy websites 310 and 311. Although website 309 also contains a link to known legitimate pharmacy 313, the links to illicit pharmacies outnumber the links to legitimate ones, and so the system infers that pharmacy website 305 is most likely also illicit.

In addition to the notations listed above, in one embodiment of the invention, the following notations are used:

S=The set of safe or licit pharmacies indexed by s∈S
Z=The set of rogue or illicit pharmacies indexed by z∈Z
$M_j$=Difference of the probabilities that a backlink to a website j directs to a licit pharmacy and an illicit pharmacy
$R_i$=Reliability score of pharmacy i
T=Threshold reliability score above which pharmacy x is considered licit.

Again let the data be represented as:

$$\begin{bmatrix} l_{(1,1)} & \cdots & l_{(1,m)} \\ \vdots & \ddots & \vdots \\ l_{(n,1)} & \cdots & l_{(n,m)} \end{bmatrix} \begin{bmatrix} y_1 \\ \vdots \\ y_n \end{bmatrix}$$

Where each row 1, 2 . . . m represents the number of backlinks to a given pharmacy website and each column 1, 2, . . . , n represents a pharmacy website.

In one embodiment, the first step is to compute the difference between the probabilities of a backlink for a referral website directing to a licit pharmacy and to an illicit pharmacy using the following formula:

$$M_j = \frac{\sum_{s \in S} l_{(s,j)} - \sum_{z \in Z} l_{(z,j)}}{\sum_{i \in I} l_{(i,j)}}$$

In one embodiment, the second step is to compute the reliability score as:

$$R_i = \frac{\sum_{j=1}^{m}(M_j \times l_{(i,j)})}{\sum_{j=1}^{m} l_{(i,j)}}$$

where $\sum_{j=1}^{m} l_{(i,j)}$=The total number of backlinks to pharmacy i

It is important to note that the sum of the proportion of potential licit backlinks to the pharmacy and the potential illicit backlinks to the pharmacy is 1. In some embodiments, if $R_i > 0$, then a pharmacy may be deemed as licit. However, in some embodiments, a given pharmacy i does not have any backlinks from any referral website in the training set. In these cases, the reliability score $R_i$ is indeterminate (0/0). Hence, for such cases, $R_i$ is set to 0.

In some embodiments, in a third step, a threshold T is estimated. As noted above, in the practice of online pharmacy status prediction, a false positive (i.e. mistakenly identifying an illicit pharmacy as legitimate) is far less desirable than a false negative (i.e. mistakenly identifying a legitimate pharmacy as illicit). Therefore, in one embodiment, the threshold T is set at:

$$T = \max_{z \in Z} R_z$$

By setting the threshold to the maximum value measured for any known illicit pharmacy, it is possible to minimize false positives.

In other embodiments, the threshold T is set via performing a k-fold validation, wherein multiple thresholds are tested against the list of pharmacy websites of known legitimacy, and the threshold yielding the highest accuracy is selected. The value of k may be selected appropriate to the size of the list of pharmacy websites of known legitimacy, and may for example be 10, 50, or 100. As would be understood by a person skilled in the art of data mining, a k-fold validation involves randomly dividing the data from a ground truth dataset (here, the list of pharmacy websites of known legitimacy) into k non-overlapping subsets, developing a prediction model using a random selection of k−1 subsets as the training set and testing against the remaining kth subset. The process is then repeated using a different selection of k−1 subsets as the training set, testing the prediction model against the remaining kth subset, and calculating the accuracy of the prediction model by comparing the results to the known data in the kth subset. The entire exercise, from training set selection to result calculation, is then repeated k times in order to produce an average accuracy, which is the average of the k different prediction models, each based on a different training and testing set as described above.

As one example based on the present invention, assuming the ground truth subset contained 1000 pharmacy websites of known legitimacy, using 50-fold validation, the 1000 pharmacy websites are divided into 50 subsets, each containing 20 pharmacy websites. Using each of the 50 subsets as the testing set and the remaining 49 subsets as the training set, a prediction model is developed using the rating method and the average accuracy is collected. Note that the prediction model depends on the threshold, so for each different threshold, a different average accuracy is obtained. At the end, the threshold with the highest average accuracy across k trials could be selected for general use with the dataset as a whole.

In some embodiments, in a fourth step, the various parameters are estimated from the training set. For a given pharmacy i, if $R_i<T$, then the pharmacy i is classified as illicit.

In some embodiments, the proposed framework is used to train an online pharmacy classification model which predicts the status of pharmacies dynamically. In some embodiments, online pharmacies whose status is predicted as illicit or licit by the model are flagged for validation. When the online pharmacies' predicted status is confirmed, the data related to the online pharmacy can be added to the prediction model, thereby expanding the ground truth dataset and making the prediction model more robust. In one embodiment, the framework is implemented in real time on Google search results, or on the results returned from another search engine known in the art.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out the exemplary embodiments of the present invention, and are not to be construed as limiting in any way the remainder of the disclosure.

Prediction Model Using NABP List of Pharmacies

The proposed framework was implemented on a dataset comprising 763 online pharmacies—50 legitimate and 713 illicit—collected from the NABP list of recommended and blacklisted pharmacies. The referral data was collected from Semrush and preprocessed as described before being used to train the prediction model. The performance of the two corresponding algorithms are compared. Four performance measures were considered: accuracy, kappa, sensitivity, and specificity. Accuracy in this instance refers to the overall proportion of correctly-classified pharmacy websites. Kappa refers to the agreement between observed and predicted classes. Sensitivity in this instance refers to the proportion of illicit pharmacies correctly identified as illicit, while specificity refers to the proportion of legitimate pharmacies correctly identified as legitimate. As discussed above, misclassification of an illicit pharmacy as legitimate is less desirable than misclassification of a legitimate pharmacy as illicit. Therefore, the optimum model should maximize sensitivity, even if the model does not maximize specificity.

The experiment was performed with cross validation, whereby a set of known data is divided into N equally-sized, disjointed sets, and one set is tested against a classification model developed based on all remaining (N−1) sets. The performance of the model is the overall mean of all N iterations of the test, each iteration testing one of the N sets against all remaining sets. The following results were generated using N=10 cross validation.

The model was tested with the Rating Method (RM) described above, and the KNN method with values of k ranging from 1 to 9. The results are in Table 1 below.

TABLE 1

| Model | Accuracy | Kappa | Specificity | Sensitivity |
|---|---|---|---|---|
| 1NN | 0.984296 | 0.843909 | 0.76 | 1 |
| 2NN | 0.985595 | 0.859443 | 0.78 | 1 |
| 3NN | 0.979015 | 0.788613 | 0.68 | 1 |
| 4NN | 0.97505 | 0.728511 | 0.62 | 1 |
| 5NN | 0.975101 | 0.728517 | 0.62 | 1 |
| 6NN | 0.972487 | 0.71137 | 0.58 | 1 |
| 7NN | 0.964592 | 0.600312 | 0.46 | 1 |
| 8NN | 0.954134 | 0.431202 | 0.3 | 1 |
| 9NN | 0.948853 | 0.320259 | 0.22 | 1 |
| RM | 0.950169 | 0.43355 | 0.36 | 0.9916 |

Figure 4:
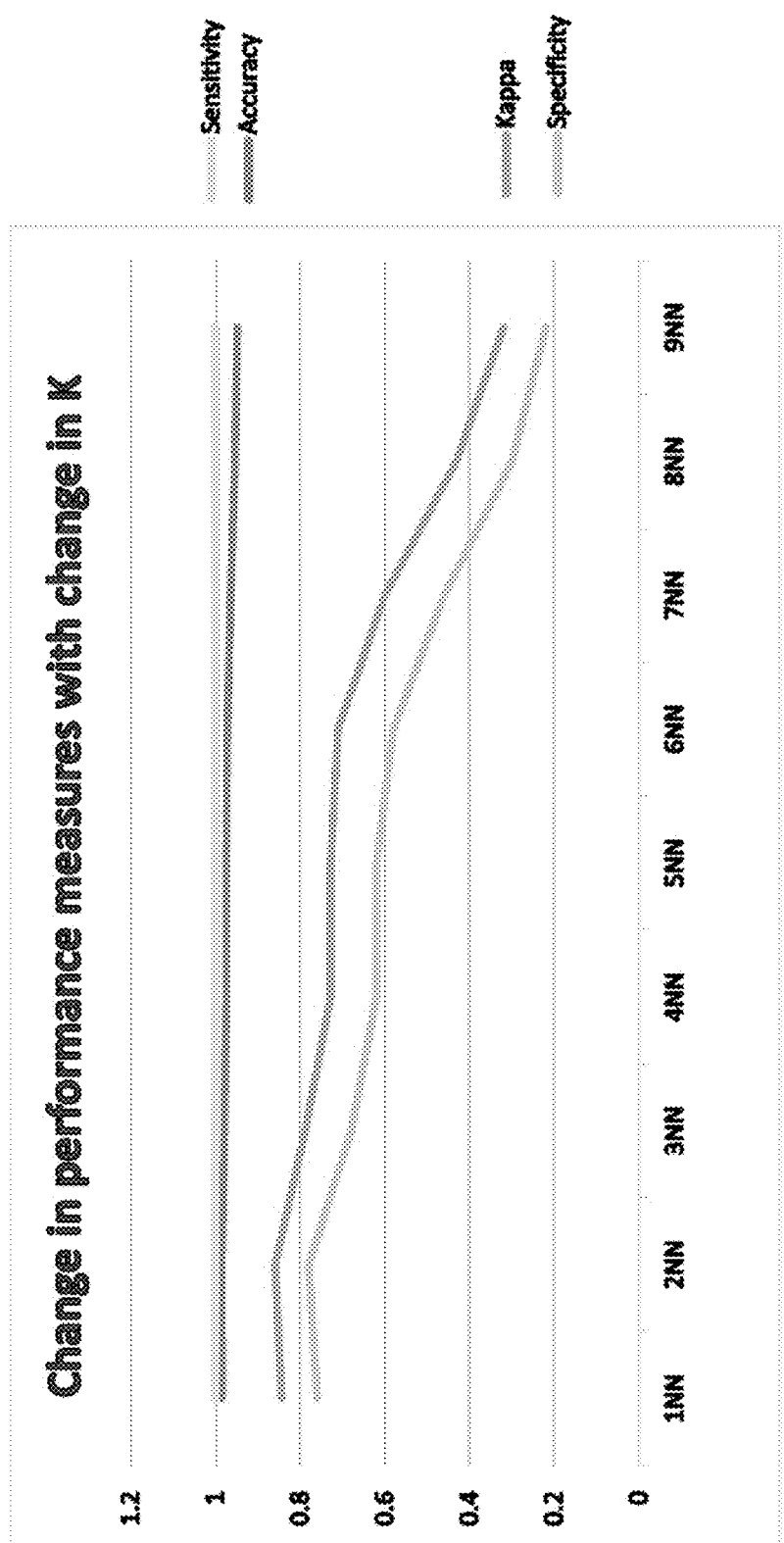
FIG. 4 is a graph depicting the relative performance of k-nearest neighbour prediction models for various values of k.

FIG. 4 depicts a graphical representation of the KNN data from Table 1. As shown, the KNN model achieves maximum sensitivity for all tested values of k, and the specificity is maximized at k=2.

Prediction Model on Google Search Results

The prediction models described in the first example were tested against a list of 300 websites (mostly pharmacies), generated by combining the top 100 websites returned from three Google searches. The search strings used were "buy xanax online," "buy opioids online," and "buy oxycontin online." Some, but not all, of the 300 sites were listed in either the LegitScript database or the NABP database as known legitimate or illicit pharmacies. Further, some of the 300 pharmacy websites had no referral data available, and therefore could not be classified by either algorithm. Table 2 shows the status of the individual search results available from the LegitScript and NABP databases.

TABLE 2

| | NABP | | | LegitScript | | |
|---|---|---|---|---|---|---|
| | Rogue | Safe | Unknown | Rogue | Safe | Unknown |
| Buy Xanax online | 11 | 0 | 89 | 48 | 0 | 52 |
| Buy Opioids online | 6 | 0 | 94 | 34 | 0 | 66 |
| Buy Oxycontin online | 10 | 0 | 90 | 25 | 0 | 75 |

Tables 3A and 3B show the results of the 2NN and RM classifications against the status identified by LegitScript. Tables 4A and 4B show the results of 2NN and RM classifications against the status identified by NABP.

TABLE 3A

| | | Status defined by LegitScript | | |
|---|---|---|---|---|
| | | Illicit | Legitimate | Unknown |
| Status Estimated by 2NN | Illicit | 106 | 0 | 145 |
| | Legitimate | 0 | 0 | 5 |
| | Unknown | 7 | 0 | 37 |

TABLE 3B

|  |  | Status defined by LegitScript | | |
|---|---|---|---|---|
|  |  | Illicit | Legitimate | Unknown |
| Status Estimated by RM | Illicit | 104 | 0 | 147 |
|  | Legitimate | 2 | 0 | 3 |
|  | Unknown | 7 | 0 | 37 |

TABLE 4A

|  |  | Status defined by NABP | | |
|---|---|---|---|---|
|  |  | Illicit | Legitimate | Unknown |
| Status Estimated by 2NN | Illicit | 27 | 0 | 225 |
|  | Legitimate | 0 | 0 | 5 |
|  | Unknown | 0 | 0 | 43 |

TABLE 4B

|  |  | Status defined by NABP | | |
|---|---|---|---|---|
|  |  | Illicit | Legitimate | Unknown |
| Status Estimated by RM | Illicit | 27 | 0 | 225 |
|  | Legitimate | 0 | 0 | 5 |
|  | Unknown | 0 | 0 | 43 |

As shown in the tables above, the 2NN prediction model produced an error rate of 0% with real-time data when assessed against the LegitScript and NABP databases. The RM prediction model produced an error rate of 1.88% when assessed against LegitScript and 0% against NABP. While 2NN produced better results in this instance, it should be noted that RM is far less resource-intensive than 2NN, and is therefore desirable in high-performance applications such as real-time evaluation built in to search engines.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of assessing the legitimacy of a subject pharmacy website comprising:
   from a network-enabled computing device, generating a prediction model comprising a list of pharmacy websites of known legitimacy and a first set of websites which contain at least one referring link to at least one of the list of pharmacy websites of known legitimacy;
   from the network-enabled computing device, collecting a second set of websites which contain at least one referring link to a subject pharmacy website whose legitimacy is unknown;
   isolating a subset of websites from the second set of websites based on the prediction model;
   comparing the subset of websites to the first set of websites linked to the list of pharmacy websites whose legitimacy is known; and
   determining the legitimacy of the subject pharmacy website based on the comparison to the first set of known legitimate pharmacy websites.

2. The method of claim 1, wherein the prediction model is a k-nearest neighbor prediction model.

3. The method of claim 1, wherein the prediction model executes in real-time to filter search engine results.

4. The method of claim 1, wherein the prediction model is configured to minimize the probability that an illicit pharmacy website will mistakenly be classified as legitimate.

5. The method of claim 1, further comprising the step of:
   if the probability that the unknown pharmacy website is legitimate is above a certain threshold, adding the unknown pharmacy website to the prediction model as a known legitimate pharmacy website.

6. The method of claim 1, further comprising the steps of:
   calculating a referral legitimacy score for each of the first and second sets of websites containing at least one referring link to at least one of the list of pharmacy websites of known legitimacy;
   setting a threshold reliability score above which evaluated pharmacies are estimated to be legitimate;
   calculating a reliability score of the subject pharmacy website whose legitimacy is unknown based on a weighted sum of the referral legitimacy scores of the referring links from the first and second sets of websites that direct to the pharmacy website whose legitimacy is unknown; and
   determining whether the subject pharmacy website is legitimate or illicit by comparing the reliability score to the threshold reliability score.

7. The method of claim 6, wherein the threshold reliability score is the maximum reliability score calculated for any pharmacy website known to be illicit.

8. The method of claim 6, wherein the threshold is selected by performing a k-fold validation and selecting the threshold with the highest average accuracy.

9. The method of claim 6, wherein the referral legitimacy score is calculated by subtracting the proportion of referring links to pharmacy websites known to be illicit from the proportion of referring links to pharmacy websites known to be legitimate.

10. The method of claim 6, further comprising the step of:
    after determining whether the subject pharmacy website is legitimate or illicit, adding the subject pharmacy website to the prediction model as a known legitimate or illicit pharmacy website for use in future predictions when the legitimacy of the subject pharmacy website is confirmed.

11. A system for assessing the legitimacy of a subject pharmacy web site comprising a non-transitory computer-readable memory with instructions stored thereon, that when executed by a processor, perform steps comprising:
    generating a prediction model comprising a list of pharmacy websites of known legitimacy and a first set of websites which contain at least one referring link to at least one of the list of pharmacy websites of known legitimacy;
    collecting a second set of websites which contain at least one referring link to a subject pharmacy website whose legitimacy is unknown;
    isolating a subset of websites from the second set of websites based on the prediction model;
    comparing the subset of websites to the first set of websites linked to the list of pharmacy websites whose legitimacy is known; and
    determining the legitimacy of the subject pharmacy website based on the comparison to the first set of known legitimate pharmacy websites.

12. The system of claim 11, wherein the prediction model is a k-nearest neighbor prediction model.

13. The system of claim 11, wherein the instructions further comprise instructions to perform the step of:
if the probability that the unknown pharmacy website is legitimate is above a certain threshold, adding the unknown pharmacy website to the prediction model as a known legitimate pharmacy website, when the legitimacy of the unknown pharmacy website is confirmed.

14. The system of claim 11, wherein the instructions further comprise instructions to perform the steps of:
calculating a referral legitimacy score to each of the first and second sets of websites containing at least one referring link to at least one of the list of pharmacy websites of known legitimacy;
setting a threshold reliability score above which evaluated pharmacies are estimated to be legitimate;
calculating a reliability score of the subject pharmacy website whose legitimacy is unknown based on the weighted sum of the referral legitimacy scores of the referring links from the first and second sets of websites that direct to the pharmacy website whose legitimacy is unknown; and
determining whether the subject pharmacy website is legitimate or illicit by comparing the reliability score to the threshold reliability score.

15. The system of claim 14, wherein the instructions further comprise instructions to perform the step of:
after determining whether the subject pharmacy website is legitimate or illicit, adding the subject pharmacy website to the prediction model as a known legitimate or illicit pharmacy website for use in future predictions when the legitimacy of the subject pharmacy website is confirmed.

16. The system of claim 14, wherein the threshold is selected by performing a k-fold validation and selecting the threshold with the highest average accuracy.

17. The system of claim 11, wherein the instructions further comprise instructions to perform the steps of:
obtaining at least one integrity score for at least one data source from which the second set of websites is compiled; and
adjusting the prediction model based on the at least one integrity score.

18. The system of claim 11, wherein the instructions further comprise instructions to perform the steps of collecting analytics traffic for the subject website, the analytics traffic divided into a set of categories comprising direct traffic, search traffic, referral traffic, social traffic, and e-mail traffic; and
adjusting the prediction model based on the analytics traffic.

19. The system of claim 11, wherein the instructions further comprise instructions to perform the step of:
receiving a search query from a client via a network;
compiling a list of results to the search query;
identifying a subset of the results that point to pharmacy websites;
determining the legitimacy of each pharmacy website in the subset of results; and
returning the legitimacy of each pharmacy website with the list of results to the client.

20. The system of claim 19, wherein the instructions further comprise instructions to perform the step of:
adding any previously unknown pharmacy websites and their determined legitimacies to the prediction model, when the legitimacies of the unknown pharmacy websites are confirmed.

* * * * *